US012468250B2

(12) United States Patent
Fukumoto

(10) Patent No.: US 12,468,250 B2
(45) Date of Patent: Nov. 11, 2025

(54) IMAGE FORMING DEVICE AND TONER REPLENISHMENT CONTROL METHOD IN IMAGE FORMING DEVICE

(71) Applicant: SHARP KABUSHIKI KAISHA, Sakai (JP)

(72) Inventor: Shohei Fukumoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 29 days.

(21) Appl. No.: 18/535,642

(22) Filed: Dec. 11, 2023

(65) Prior Publication Data

US 2024/0192625 A1 Jun. 13, 2024

(30) Foreign Application Priority Data

Dec. 13, 2022 (JP) ................................ 2022-198833

(51) Int. Cl.
*G03G 15/08* (2006.01)
*G03G 15/00* (2006.01)

(52) U.S. Cl.
CPC ......... *G03G 15/556* (2013.01); *G03G 15/086* (2013.01); *G03G 15/0865* (2013.01); *G03G 15/0889* (2013.01); *G03G 2215/0819* (2013.01)

(58) Field of Classification Search
CPC ........... G03G 15/0856; G03G 15/0877; G03G 15/556; G03G 15/0848; G03G 15/0849
See application file for complete search history.

(56) References Cited

U.S. PATENT DOCUMENTS

| | | | | |
|---|---|---|---|---|
| 6,349,183 B1 | 2/2002 | Nagamine et al. | | |
| 9,753,398 B2 * | 9/2017 | Miura | G03G 15/0856 | |
| 10,990,033 B2 * | 4/2021 | Onodera | G03G 15/0865 | |
| 2009/0290886 A1 * | 11/2009 | Murauchi | G03G 15/0893 | 399/257 |
| 2016/0202635 A1 * | 7/2016 | Shirakata | G03G 15/0877 | 399/27 |
| 2022/0244660 A1 * | 8/2022 | Fukaya | G03G 15/0849 | |

FOREIGN PATENT DOCUMENTS

JP 2001-312134 A 11/2001

* cited by examiner

*Primary Examiner* — Jessica L Eley
(74) *Attorney, Agent, or Firm* — ScienBiziP, P.C.

(57) ABSTRACT

According to an image forming device of the present disclosure, a required replenishment amount is calculated based on a printing rate derived from image data, and toner is replenished to a development device by a toner replenishment device for a required replenishment time in accordance with the required replenishment amount. Then, a time difference obtained by subtracting a printing time per sheet from the required replenishment time is accumulated, and a determination regarding forcible replenishment of the toner is made based on a comparison between an accumulated required replenishment time and an accumulated required replenishment time threshold value.

7 Claims, 13 Drawing Sheets

| PRINTING RATE Rx (%) | REQUIRED REPLENISHMENT AMOUNT Qy (g) | REQUIRED REPLENISHMENT TIME Ty (s) | TIME DIFFERENCE ΔTz (s) |
|---|---|---|---|
| 5 | 0.019 | 0.093 | −0.575 |
| 10 | 0.037 | 0.185 | −0.482 |
| 20 | 0.074 | 0.370 | −0.297 |
| 30 | 0.111 | 0.555 | −0.112 |
| 36 | 0.133 | 0.666 | −0.001 |
| 40 | 0.148 | 0.740 | 0.073 |
| 50 | 0.185 | 0.925 | 0.258 |
| ⋮ | ⋮ | ⋮ | ⋮ |
| 100 | 0.370 | 1.850 | 1.183 |

REPLENISHMENT SATISFIED

REPLENISHMENT SHORTAGE

* REPLENISHMENT SPEED Vq = 0.2 g/s

* PRINTING TIME Tx PER SHEET = 0.667 s (90 sheets/min)

* MAXIMUM REPLENISHMENT AMOUNT Qmax PER SHEET = 0.133 g (= Vq·Tx)

FIG. 3

200

| AVERAGE PRINTING RATE Ra (%) OF N MOST RECENT SHEETS | ACCUMULATED REQUIRED REPLENISHMENT TIME THRESHOLD VALUE Ta (s) |
| --- | --- |
| $Ra \leqq 40$ | 2.50 |
| $40 < Ra \leqq 60$ | 2.00 |
| $60 < Ra \leqq 80$ | 1.75 |
| $Ra > 80$ | 1.50 |

FIG. 4

| NUMBER OF PRINTED SHEETS (SHEET) | PRINTING RATE Rx (%) | AVERAGE PRINTING RATE Ra (%) OF N MOST RECENT SHEETS: N = 5 | TIME DIFFERENCE ΔTz (s) | ACCUMULATED REQUIRED REPLENISHMENT TIME Tz (s) | ACCUMULATED REQUIRED REPLENISHMENT TIME THRESHOLD VALUE Ta (s) | FORCIBLE REPLENISHMENT NECESSITY DETERMINATION |
|---|---|---|---|---|---|---|
| 0 | — | 5 | 0 | 0 | 2.50 | × |
| 1 | 50 | 14 | 0.258 | 0.258 | 2.50 | × |
| 2 | 50 | 23 | 0.258 | 0.516 | 2.50 | × |
| 3 | 50 | 32 | 0.258 | 0.774 | 2.50 | × |
| 4 | 50 | 41 | 0.258 | 1.032 | 2.00 | × |
| 5 | 50 | 50 | 0.258 | 1.290 | 2.00 | × |
| 6 | 50 | 50 | 0.258 | 1.548 | 2.00 | × |
| 7 | 50 | 50 | 0.258 | 1.806 | 2.00 | × |
| 8 | 50 | 50 | 0.258 | 2.064 | 2.00 | ○ |

FIG. 5

| NUMBER OF PRINTED SHEETS (SHEET) | PRINTING RATE Rx (%) | AVERAGE PRINTING RATE Ra (%) OF N MOST RECENT SHEETS: N = 5 | TIME DIFFERENCE ΔTz (s) | ACCUMULATED REQUIRED REPLENISHMENT TIME Tz (s) | ACCUMULATED REQUIRED REPLENISHMENT TIME THRESHOLD VALUE Ta (s) | FORCIBLE REPLENISHMENT NECESSITY DETERMINATION |
|---|---|---|---|---|---|---|
| 0 | — | 5 | 0 | 0 | 2.50 | × |
| 1 | 50 | 14 | 0.258 | 0.258 | 2.50 | × |
| 2 | 50 | 23 | 0.258 | 0.516 | 2.50 | × |
| 3 | 50 | 32 | 0.258 | 0.774 | 2.50 | × |
| 4 | 50 | 41 | 0.258 | 1.032 | 2.00 | × |
| 5 | 50 | 50 | 0.258 | 1.290 | 2.00 | × |
| 6 | 5 | 41 | −0.575 | 0.716 | 2.00 | × |
| 7 | 5 | 32 | −0.575 | 0.141 | 2.50 | × |
| 8 | 50 | 32 | 0.258 | 0.399 | 2.50 | × |
| 9 | 50 | 32 | 0.258 | 0.657 | 2.50 | × |
| 10 | 50 | 32 | 0.258 | 0.915 | 2.50 | × |
| 11 | 50 | 41 | 0.258 | 1.173 | 2.00 | × |
| 12 | 50 | 50 | 0.258 | 1.431 | 2.00 | × |
| 13 | 10 | 42 | −0.482 | 0.949 | 2.00 | × |
| 14 | 10 | 34 | −0.482 | 0.467 | 2.50 | × |
| 15 | 10 | 26 | −0.482 | 0 | 2.50 | × |

FIG. 6

300

| AVERAGE PRINTING RATE Ra (%) OF N MOST RECENT SHEETS | AGITATION TIME Tb (s) |
|---|---|
| Ra ≦ 40 | 10 |
| 40 < Ra ≦ 60 | 10 |
| 60 < Ra ≦ 80 | 15 |
| Ra > 80 | 15 |

FIG. 12

400

| TONER DENSITY T/D (wt%) | THRESHOLD VALUE COEFFICIENT β |
|---|---|
| T/D ≦ 5.0 | 0.75 |
| 5.0 < T/D ≦ 5.5 | 1.00 |
| 5.5 < T/D ≦ 6.5 | 1.25 |
| 6.5 < T/D ≦ 7.0 | 1.00 |
| T/D > 7.0 | 0.75 |

FIG. 13

IMAGE FORMING DEVICE AND TONER REPLENISHMENT CONTROL METHOD IN IMAGE FORMING DEVICE

TECHNICAL FIELD

The present disclosure relates to an image forming device and a toner replenishment control method in the image forming device, and more particularly, to an image forming device that performs image forming processing of forming an image based on image data on an image recording medium by an electrophotographic method and a toner replenishment control method in the image forming device.

BACKGROUND ART

In an image forming device that performs image forming processing by an electrophotographic method, toner is supplied from a development device to an electrostatic latent image based on image data formed on an image carrier, to thereby visualize the electrostatic latent image with the toner. The development device includes an agitation means for agitating the toner, strictly speaking, a developer containing the toner accommodated in an accommodator. The developer is agitated by the agitation means, and thus the developer is charged, that is, static electricity is applied to the toner. This static electricity is utilized to supply the toner to the electrostatic latent image as described above. When the toner is supplied from the development device to the electrostatic latent image, the toner in the development device, more specifically, the toner accommodated in the accommodator included in the development device is consumed. Thus, to compensate for the consumption of the toner, the toner is replenished from the toner replenishment means to the accommodator.

A replenishment amount per unit time of the toner by the toner replenishment means, that is, a replenishment speed, is determined in advance, and is usually set to a constant value that can sufficiently secure an agitation time required for charging the toner replenished by the toner replenishment means as intended. Thus, when a printing rate of an image based on image data is higher than a predetermined value, particularly when development for forming such an image based on image data is continuously performed, the replenishment amount of the toner by the toner replenishment means may be insufficient for the amount of toner consumed in the development. Then, the amount of toner in the accommodator becomes insufficient, in other words, the concentration of the toner in the developer becomes insufficient. As a result, an image quality defect such as a decrease in density occurs in an image, namely, an output image formed on an image recording medium such as a sheet by the image forming processing including the development.

To avoid this, for example, when the replenishment amount of the toner by the toner replenishment means is insufficient for the amount of toner consumed in the development, the image forming processing including the development is interrupted and forcible replenishment is performed in which the shortage of the toner is replenished. However, if the forcible replenishment is frequently performed, the image forming processing is accordingly also interrupted frequently. This reduces the efficiency of the image forming processing and thus reduces productivity. Thus, it is important to reduce the frequency of the forcible replenishment as much as possible. Further, after the forcible replenishment is performed, the developer accommodated in the accommodator of the development device by the forcible replenishment needs to be sufficiently agitated. If this agitation is insufficient, the developer is not charged as intended, that is, the developer is insufficiently charged, and charging unevenness (agitation unevenness) occurs. Additionally, another image quality defect called fogging occurs in which a toner image is formed at an unintended portion on the image recording medium.

To solve the above-described problem, a technique is known in which a history of a toner replenishment amount by the toner replenishment means is stored, whether the toner is in an excessive toner consumption state is determined based on the stored toner replenishment amount history information, and in a case where it is determined that the toner is in the excessive toner consumption state, the forcible replenishment and a developer agitation operation are temporarily performed. According to this technique, the ease of development by the development device can always be maintained at a satisfactory level without reducing productivity unnecessarily.

SUMMARY

Technical Problem

The above-described printing rate can also be derived from the image data (pixel data). In this case, the image quality defects such as a decrease in density and fogging of the output image may be prevented by appropriately determining whether the forcible replenishment of the toner is to be performed based on the printing rate derived from the image data and in turn suppressing the frequency of performing the forcible replenishment.

It is an object of the present disclosure to provide a novel image forming device and toner replenishment control method in the image forming device in which the occurrence of the image quality defects such as a decrease in density and fogging of the output image can be prevented by appropriately determining whether the forcible replenishment of the toner is to be performed based on the printing rate derived from the image data and in turn suppressing the frequency of performing the forcible replenishment.

Solution to Problem

To achieve this object, the present disclosure includes a first disclosure related to an image forming device and a second disclosure related to a toner replenishment control method in an image forming device.

The first disclosure related to the image forming device includes a development means, a toner replenishment means, a calculation means, a replenishment control means, and an accumulation means. The development means includes an accommodator accommodating a developer containing toner. The development means performs development of visualizing a latent image formed on an image carrier based on image data into a toner image by causing the toner to adhere to the latent image. The toner replenishment means replenishes the toner to the accommodator of the development means. The calculation means calculates a required replenishment amount, which is a replenishment amount of the toner required to compensate for the consumption of the toner by the development, based on the printing rate derived from the image data. The replenishment control means controls the toner replenishment means so as to replenish the toner corresponding to the required replenishment amount calculated by the calculation means to the accommodator of the development means. The accumulation means accumulates a replenishment shortage amount being a shortage of the replenishment amount of the toner to be replenished by the toner replenishment means relative to the required replenishment amount. Further, when an accumulated shortage amount being an accumulated value of the replenishment shortage amount accumulated by the accumulation means becomes a predetermined reference amount or more, the replenishment control means interrupts the development by the development means and causes the toner replenishment means to execute forcible replenishment of replenishing the toner corresponding to the accumulated shortage amount to the accommodator of the development means.

In the first disclosure, a first reference amount setting means may be further provided. The first reference amount setting means sets a reference amount in accordance with an average printing rate being an average value of printing rates derived from image data subjected to a most recent predetermined number of times of the development.

The development means includes an agitation means that agitates the developer accommodated in the accommodator. The replenishment control means preferably further causes the agitation means to agitate the developer for a predetermined agitation time after executing the forcible replenishment by the toner replenishment means and before resuming the development by the development means.

In this case, an agitation time setting means may be provided. The agitation time setting means sets the agitation time in accordance with the above-described average printing rate.

The replenishment control means may cause the toner replenishment means to intermittently replenish the toner to the accommodator of the development device in the forcible replenishment.

Furthermore, in the first disclosure, a toner density detection means and a second reference value setting means may be provided. The toner density detection means detects the density of the toner contained in the developer accommodated in the accommodator. The second reference value setting means sets a reference amount in accordance with a toner density detected value detected by the toner density detection means.

The second disclosure related to the toner replenishment control method in the image forming device of the present disclosure includes a calculation step, a replenishment control step, and an accumulation step. The image forming device includes the development means and the toner replenishment means. The development means includes the accommodator accommodating the developer containing the toner. The development means performs development of visualizing the latent image formed on the image carrier based on the image data into the toner image by causing the toner to adhere to the latent image. The toner replenishment means replenishes the toner to the accommodator of the development means. In addition, in the calculation step, the required replenishment amount, which is the replenishment amount of the toner required to compensate for the consumption of the toner by the development, is calculated based on the printing rate derived from the image data. In the replenishment control step, the toner replenishment means is controlled so as to replenish the toner corresponding to the required replenishment amount calculated by the calculation means to the accommodator of the development means. Then, in the accumulation step, a replenishment shortage amount being the shortage of the replenishment amount of the toner to be replenished by the toner replenishment means relative to the required replenishment amount, is accumulated. Further, in the replenishment control step, when the accumulated shortage amount being the accumulated value of the replenishment shortage amount accumulated by the accumulation means becomes the predetermined reference amount or more, the development by the development means is interrupted and the toner replenishment means is caused to execute the forcible replenishment for replenishing the toner corresponding to the accumulated shortage amount to the accommodator of the development means.

Advantageous Effects of Invention

According to the present disclosure, the image quality defects such as a decrease in density and fogging of the output image can be prevented by appropriately determining whether the forcible replenishment of the toner is to be performed based on the printing rate derived from the image data and in turn suppressing the frequency of performing the forcible replenishment.

BRIEF DESCRIPTION OF DRAWINGS

FIG. 3 is a table showing a relationship among a printing rate of a document, a required replenishment amount of toner, a required replenishment time of the toner, and a time difference in the first example.

FIG. 4 is a table conceptually showing a configuration of a time threshold value table in the first example.

FIG. 5 is a table showing a determination procedure of whether forcible replenishment is necessary in the first example.

FIG. 6 is another table showing the procedure for determining whether the forcible replenishment is necessary in the first example.

FIG. 12 is a table conceptually showing a configuration of an agitation time table in a second example of the present disclosure.

FIG. 13 is a table conceptually showing a configuration of a threshold value coefficient table in a third example of the present disclosure.

DESCRIPTION OF EMBODIMENTS

First Example

Figure 1:
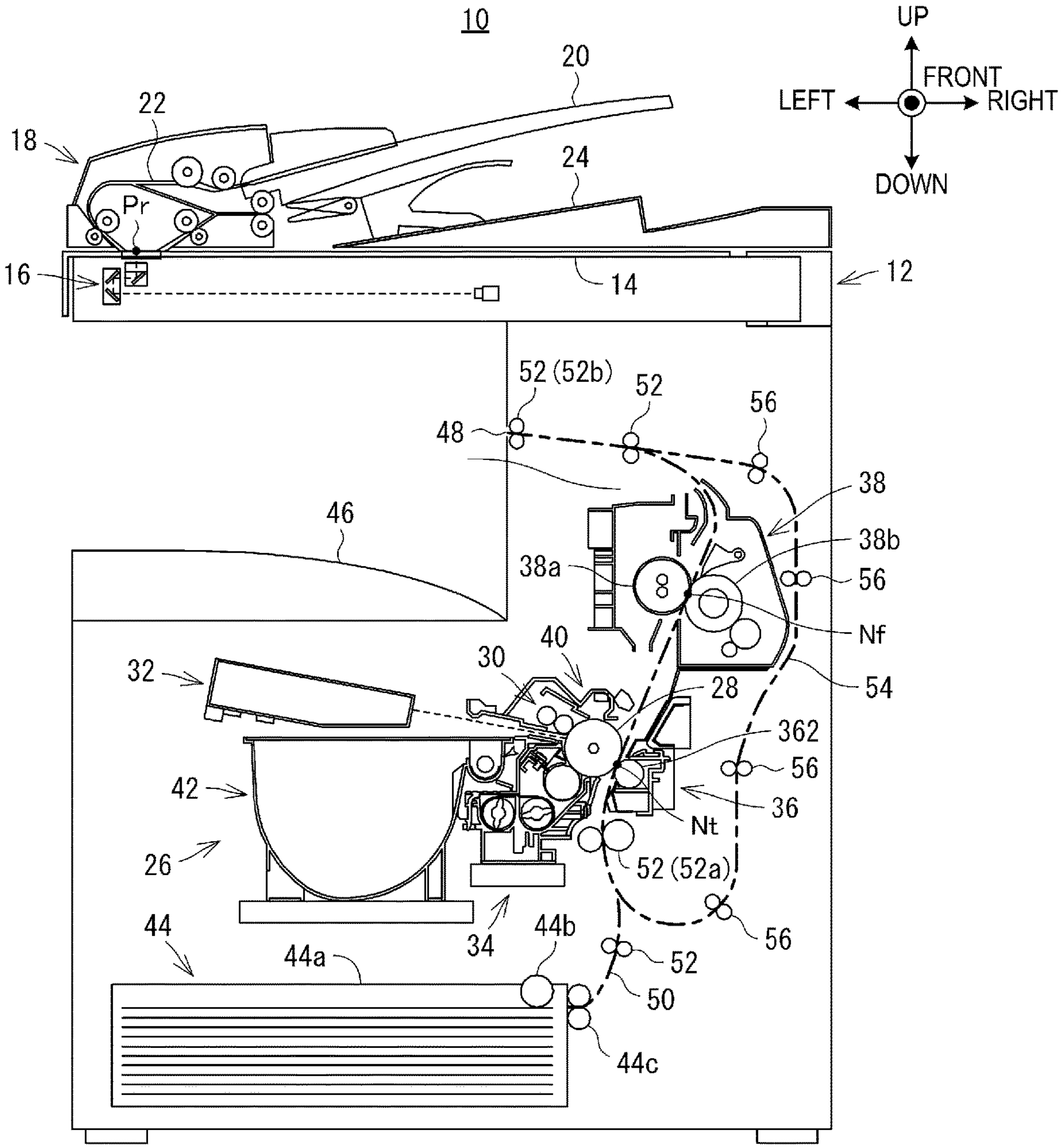
FIG. 1 is a schematic view illustrating an internal configuration of an image forming device according to a first example of the present disclosure.

A first example of the present disclosure will be described with reference to a monochrome image forming device 10 illustrated in FIG. 1 as an example.

The image forming device 10 according to the first example is a so-called multifunction peripheral (MFP) having a plurality of functions such as a copy function, a printer function, an image scanner function, and a facsimile function. FIG. 1 is a diagram illustrating an internal configuration of the image forming device 10 installed in a usable state as viewed from a front side of the image forming device 10. More specifically, the up-down direction in FIG. 1 corresponds to the up-down direction of the image forming device 10. The left-right direction in FIG. 1 corresponds to the left-right direction of the image forming device 10. Further, a front side of the plane of paper in FIG. 1 corresponds to the front of the image forming device 10. A back side of the plane of paper in FIG. 1 corresponds to the rear of the image forming device 10.

In an upper portion of the image forming device 10, an image scanner 12 is provided as an image scanning means. The image scanner 12 performs image scanning processing of scanning an image of a document (not illustrated) and outputting two dimensional scan image data in accordance with the image of the document. The image scanner 12 includes a document platen 14 on which the document is placed. The document platen 14 is made of a transparent material such as glass and has a substantially rectangular flat plate shape, and is provided so that both main surfaces thereof are along a horizontal direction. An image scanning unit 16 is provided below the document platen 14. While detailed description will not be given, the image scanning unit 16 includes a light source, a mirror, a lens, and a line sensor, and forms an image scanning position PR having a linear shape and extending along the front-rear direction of the image forming device 10 on the upper surface of the document platen 14. In addition, a driving mechanism (not illustrated) that causes the image scanning position Pr of the image scanning unit 16 to move (be scanned) along the left-right direction of the image forming device 10 is provided below the document platen 14. That is, the image scanning position Pr of the image scanning unit 16 is moved by the driving mechanism in a state where the document is placed on the document platen 14. As a result, the image of the document is scanned by a so-called fixed-scanning method. The front-rear direction of the image forming device 10 is referred to as a main scanning direction. The left-right direction of the image forming device 10 is referred to as a sub-scanning direction.

An automatic document feeder (ADF) 18 which also serves as a document pressing cover for pressing the document placed on the document platen 14 is provided above the document platen 14. The automatic document feeder 18 is configured to transition between a state of causing the upper surface of the document platen 14 to be exposed to the outside and a state of covering the upper surface of the document platen 14. Thus, the automatic document feeder 18 is coupled to a main body (housing) of the image forming device 10 via an appropriate movable support member such as a hinge (not illustrated). FIG. 1 illustrates a state in which the automatic document feeder 18 covers the upper surface of the document platen 14. When the automatic document feeder 18 is in the state of covering the upper surface of the document platen 14 as illustrated in FIG. 1, the automatic document feeder 18 performs its intended function, as will be described below.

That is, the automatic document feeder 18 includes a document placement tray 20. On the document placement tray 20, a document, strictly speaking, a sheet-like document can be placed. More particularly, a plurality of the documents can be placed in a stacked manner. While detailed description will not be given, the automatic document feeder 18 takes in the documents placed on the document placement tray 20 in units of one sheet (one by one) and conveys each document along a document conveying path 22 in the automatic document feeder 18. On the way, the document passes through the image scanning position Pr, strictly speaking, passes through the image scanning position Pr which is in a fixed state. As a result, the image of the document is scanned by a so-called flow-scanning method. Thereafter, the document is discharged to a document discharge tray 24.

Below the image scanner 12, an image former 26 is provided as an image forming means. The image former 26 performs image forming processing of forming an image based on appropriate image data such as the above-described scan image data on a sheet-like image recording medium (not illustrated), for example, a sheet. In other words, the image former 26 performs printing. This printing is performed by a known electrophotographic method.

Specifically, the image former 26 includes a photoreceptor drum 28 as an image carrier, a charging device 30 as a charging means, an exposure device 32 as an exposure means, a development device 34 as a development means, a transfer device 36 as a transfer means, a fixing device 38 as a fixing means, a cleaning device 40 as a cleaning means, a discharging device (not illustrated) as a discharging means, and a toner replenishment device 42 as a toner replenishment means.

The photoreceptor drum 28 includes a substrate, which is a cylindrical conductive member made of a conductive material such as aluminum. The substrate is connected to a frame (not illustrated) of the image forming device 10, that is, grounded. A photosensitive layer is formed on a surface (outer peripheral surface) of the substrate. The photosensitive layer exhibits conductivity at a portion irradiated with light and exhibits an insulating property at a portion not irradiated with light. The photoreceptor drum 28 rotates (e.g., rotates counterclockwise in FIG. 1) upon receiving a driving force from a photoreceptor drum motor (not illustrated) as a photoreceptor drum driving means.

The charging device 30 applies static electricity to the surface of the photoreceptor drum 28 to charge the surface of the photoreceptor drum 28 at a predetermined potential, for example, a negative potential based on a ground potential. The charged surface of the photoreceptor drum 28 is exposed by the exposure device 32. The exposure device 32 is, for example, a laser scanning unit and irradiates the surface of the photoreceptor drum 28 with laser light in a pattern based on the image data to be subjected to the image forming processing. More specifically, the exposure device 32 irradiates a position downstream of the charging position by the charging device 30 in the rotation direction of the photoreceptor drum 28. As a result, an electrostatic latent image based on the image data to be subjected to the image forming processing is formed on the surface of the photoreceptor drum 28. The exposure device 32 may be, for example, an LED unit including an LED array in which LEDs are arranged as a light source, instead of the laser scanning unit.

The development by the development device 34 is performed on the surface of the photoreceptor drum 28 in which the electrostatic latent image is formed as described above. That is, the development device 34 causes toner (not illustrated) charged at the same polarity as the surface potential of the photoreceptor drum 28, that is, charged at a negative potential based on the ground potential to adhere to the electrostatic latent image formed on the surface of the photoreceptor drum 28, thus visualizing the electrostatic latent image into the toner image. Thus, as will be described later (see FIG. 2), the development device 34 includes a first conveying screw 342 and a second conveying screw 344 that charge the developer by conveying the developer containing the toner in the development device 34 while agitating the developer, and a developing roller 346 that conveys the charged developer to the vicinity of the surface of the photoreceptor drum 28. The developer is a two-component developer containing a carrier in addition to the toner. The toner is a non-magnetic material, and the carrier is a magnetic material.

The toner image formed on the surface of the photoreceptor drum 28 in the development performed by the development device 34 is transferred to the sheet by the transfer device 36 at a position downstream of a position at which the development device 34 performs development in the rotation direction of the photoreceptor drum 28. For this purpose, the transfer device 36 includes a transfer roller 362. The transfer roller 362 rotates in a state with its own surface in contact with the surface of the photoreceptor drum 28. In this case, the transfer roller 362 is driven to rotate upon receiving a rotational driving force of the photoreceptor drum 28, that is, rotates clockwise in FIG. 1. In addition, a transfer current, which is a positive DC current based on the ground potential, is supplied to the transfer roller 362 from a transfer bias power source (not illustrated), which is a DC constant current source. As a result, a transfer electric field for attracting the toner image on the surface of the photoreceptor drum 28 toward the transfer roller 362 is formed at a transfer nip portion Nt, which is a contact portion between the surface of the photoreceptor drum 28 and the surface of the transfer roller 362. Then, the sheet passes through the transfer nip portion Nt such that the toner image on the surface of the photoreceptor drum 28 is transferred to the sheet.

The surface of the photoreceptor drum 28 after the transfer of the toner image is cleaned by the cleaning device 40 downstream of a position at which the transfer device 36 performs transfer in the rotation direction of the photoreceptor drum 28. While detailed description will not be given, the cleaning device 40 includes a cleaning blade that removes toner (residual toner) remaining on the surface of the photoreceptor drum 28 and a conveying member that conveys the toner removed by the cleaning blade to a waste toner box (not illustrated).

The surface of the photoreceptor drum 28 cleaned by the cleaning device 40 is destaticized by a destaticizing device (not illustrated) at a position downstream of the position at which the cleaning device 40 cleans in the rotation direction of the photoreceptor drum 28. The destaticizing device irradiates the surface of the photoreceptor drum 28 with light, thus destaticizing the surface of the photoreceptor drum 28, that is, erasing a latent image potential on the surface of the photoreceptor drum 28.

Thereafter, in the same procedure as described above, steps of charge by the charging device 30, exposure by the exposure device 32, development by the development device 34, transfer by the transfer device 36, cleaning by the cleaning device 40, and destaticizing by the destaticizing device are repeated.

The toner in the development device 34, strictly speaking, in a first chamber 348 and a second chamber 350 serving as accommodators to be described later (see FIG. 2) is consumed by the development performed by the development device 34. To compensate for the consumption of the toner by the development, the toner is replenished by the toner replenishment device 42 to the development device 34, strictly speaking, to the first chamber 348, as will be described later. The procedure of replenishing toner to the first chamber 348 by the toner replenishment device 42 will be described in detail later.

In the image forming device 10, a sheet conveying path 50 is provided from a sheet feeder 44 to be described later to a sheet discharge port 48 toward a discharge tray 46 to be described later via the transfer nip portion Nt. At appropriate positions along the sheet conveying path 50, a plurality of conveying rollers (strictly speaking, roller pairs) 52, 52, . . . for conveying the sheet from the sheet feeder 44 to the sheet discharge port 48 are provided, respectively. The conveying roller 52 of the conveying rollers 52, 52, . . . provided at a position upstream of the transfer nip portion Nt in a conveying direction of the sheet in the sheet conveying path 50 and closest to the transfer nip portion Nt is a registration roller **52*a* for measuring timing at which the sheet passes through the transfer nip portion Nt. The sheet is nipped and conveyed by the transfer nip portion Nt at the transfer nip portion Nt. The conveying roller 52 of the conveying rollers 52, 52, . . . provided on the most downstream side in the conveying direction of the sheet in the sheet conveying path 50, that is, provided in the vicinity of the sheet discharge port 48 is a sheet discharge roller 52*b* for discharging the sheet to the discharge tray 46 via the sheet discharge port 48**.

The fixing device 38 is provided at a position between the transfer nip portion Nt and the sheet discharge port 48 in the sheet conveying path 50, in other words, at a position downstream of the transfer nip portion Nt in the conveying direction of the sheet in the sheet conveying path 50. The fixing device 38 includes a heat roller **38*a* and a pressure roller 38*b*. The heat roller 38*a* and the pressure roller 38*b* are provided such that their surfaces (outer peripheral surfaces) are in contact with each other. The heat roller 38*a* is heated to a predetermined temperature (fixing temperature). In addition, the heat roller 38*a* rotates upon receiving a driving force from a motor serving as a fixing roller driving means (not illustrated), for example, rotates counterclockwise in FIG. 1. Accordingly, the pressure roller 38*b* also rotates, that is, is driven to rotate clockwise in FIG. 1. Then, the sheet having passed through the transfer nip portion Nt passes through a fixing nip portion Nf, which is a contact portion between the surface of the heat roller 38*a* and the surface of the pressure roller 38*b*. More specifically, the sheet is nipped and conveyed by the fixing nip portion Nf. As a result, the toner image on the sheet is fixed (thermally fixed) on the sheet. Thus, the series of image forming processing steps by the image former 26** is complete.

The sheet (printed matter) on which the image forming processing has been performed is discharged to the discharge tray 46. The discharge tray 46 is provided between the image former 26 and the image scanner 12, that is, provided in a so-called in-body space of the image forming device 10. Alternatively, the discharge tray 46 may be provided outside the image forming device 10.

Further, at a lower portion in the image forming device 10, the sheet feeder 44 as a sheet feeding means is provided. The sheet feeder 44 includes a sheet feeding cassette **44*a*, and a plurality of the sheets can be accommodated in a stacked manner in the sheet feeding cassette 44*a*. In addition, the sheet feeder 44 includes a pickup roller 44*b* and a sheet feeding roller (strictly speaking, a roller pair) 44*c*. The sheet feeder 44 takes out the sheets accommodated in the sheet feeding cassette 44*a* in units of one sheet by the pickup roller 44*b* and supplies the taken out sheets to the sheet conveying path 50 by the sheet feeding roller 44*c***.

In addition, a conveying path 54 for double-sided printing is provided in the image forming device 10. The conveying path 54 for double-sided printing is a conveying path for taking in a sheet having once passed through the fixing nip portion Nf, that is, a sheet after printing, and subjecting the sheet to printing again. That is, the sheet taken into the conveying path 54 for double-sided printing is supplied again to the sheet conveying path 50, specifically, to the upstream side of the registration roller 52*a*. At this time, the front and back of the sheet are reversed. As a result, printing is performed on the back surface of the sheet, that is, double-sided printing is performed. Conveying rollers (strictly speaking, roller pairs) 56, 56, . . . are also provided at appropriate positions, respectively, of the conveying path 54 for the double-sided printing.

Figure 2:
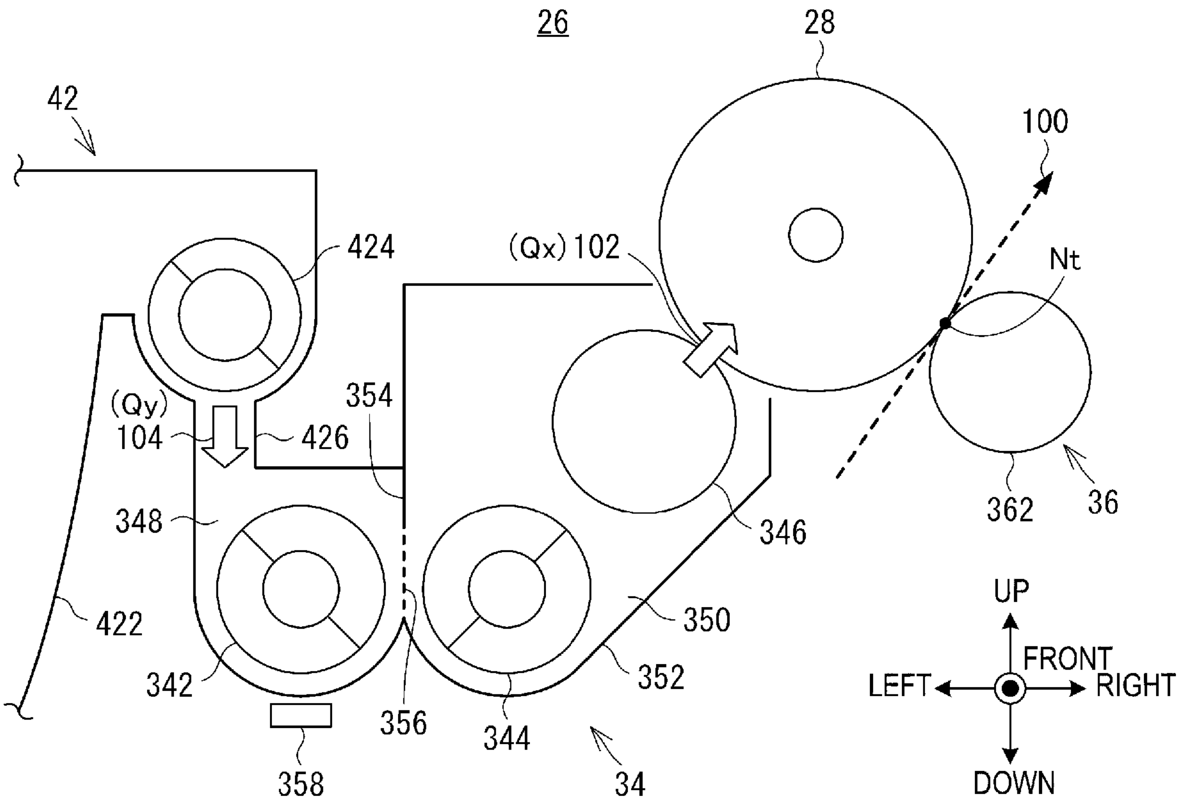
FIG. 2 is a schematic view illustrating a configuration of a part of an image former of the first example.

Focusing on the development device 34, the development device 34 includes two spaces, namely, the first chamber 348 and the second chamber 350, as illustrated in FIG. 2. The first chamber 348 and the second chamber 350 are formed by a housing 352 of the development device 34.

Although not apparent in FIG. 2, the first chamber 348 and the second chamber 350 are elongated spaces extending in the front-rear direction of the image forming device 10 while being parallel to each other. The first chamber 348 and the second chamber 350 are partitioned by a partition wall 354 and communicate with each other via two communicating portions 356 provided in the vicinity of end portions of the first chamber 348 and the second chamber 350, respectively. The first conveying screw 342 is provided in the first chamber 348, and the second conveying screw 344 is provided in the second chamber 350. The developer is accommodated in the first chamber 348 and the second chamber 350.

The first conveying screw 342 and the second conveying screw 344 rotate upon receiving a driving force from a motor serving as a developing driving means (not illustrated), and strictly speaking, rotate upon receiving the driving force via an appropriate gear serving as a driving force transmitting means (not illustrated). As a result, the developer in the first chamber 348 and the second chamber 350 is conveyed so as to circulate between the first chamber 348 and the second chamber 350 via the two communicating portions 356. At this time, the developer, that is, the toner and the carrier contained in the developer are agitated and charged by friction of the agitation. The first conveying screw 342 and the second conveying screw 344 are examples of agitation means according to the present disclosure.

The developer thus charged is attracted to the surface of the developing roller 346 by a magnetic force by a magnet (not illustrated) in the developing roller 346 provided above the second chamber 350. The developing roller 346 is provided such that its own surface is close to the surface of the photoreceptor drum 28, and rotates upon receiving the driving force from the above-described motor serving as the developing driving means, for example, rotates in a direction opposite to the rotation direction of the photoreceptor drum 28, that is, rotates clockwise in FIG. 2. As the developing roller 346 rotates, the developer on the surface of the developing roller 346 is carried to the vicinity of the surface of the photoreceptor drum 28. Then, only the toner of the developer on the surface of the developing roller 346 adheres to the electrostatic latent image on the surface of the photoreceptor drum 28, and the electrostatic latent image is visualized into the toner image, that is, development is performed. At this time, a predetermined developing bias voltage is applied to the developing roller 346 from a developing bias power source (not illustrated). Thereafter, as the developing roller 346 rotates, the developer on the surface of the developing roller 346 is further carried toward the second chamber 350 and is returned to the second chamber 350. The developer returned to the second chamber 350 is agitated while being conveyed again between the second chamber 350 and the first chamber 348.

The toner image formed on the surface of the photoreceptor drum 28 by this development is transferred to the sheet by the transfer device 36, as described above. That is, as indicated by a broken-line arrow 100 in FIG. 2, the sheet passes through the transfer nip portion Nt, which is a contact portion between the surface of the photoreceptor drum 28 and the surface of the transfer roller 362, such that the toner image formed on the surface of the photoreceptor drum 28 is transferred to the sheet.

In the development, that is, in the printing including the development, the toner is consumed as indicated by an outline arrow 102 in FIG. 2. Thus, in accordance with a consumption amount Qx of the toner, new toner is replenished by the toner replenishment device 42 to the development device 34, specifically, replenished to the first chamber 348.

The toner replenishment device 42 includes a storage tank 422 in which the toner is stored, a replenishment screw 424, and a conveying mechanism (not illustrated) that conveys the toner in the storage tank 422 to the replenishment screw 424. The toner replenishment device 42 rotates the replenishment screw 424 to replenish the toner to the first chamber 348 via a replenishment path 426. Although not illustrated in FIG. 2, the toner replenishment device 42 includes a toner replenishment motor 428 (see FIG. 7) as a toner replenishment driving means for rotating the replenishment screw 424. The toner replenished from the toner replenishment device 42 to the first chamber 348 via the replenishment path 426 is replenished from above the first chamber 348, as indicated by an outline arrow 104 in FIG. 2.

Below the first chamber 348, a toner density sensor 358 is provided as a toner density detection means for detecting a density (mass ratio of the toner to the carrier) T/D of the toner contained in the developer in the first chamber 348. The toner density sensor 358 is a so-called magnetic permeability sensor and detects a bulk density of the carrier contained in the developer by measuring the magnetic permeability of the developer, thus detecting the toner density T/D. Although not apparent in FIG. 2, the toner density sensor 358 is provided at a position away from a position at which the toner is replenished to the first chamber 348 via the replenishment path 426, that is, at a position where the toner density in the developer after being sufficiently agitated can be detected. Thus, the toner density sensor 358 may be provided below the second chamber 350.

An amount Qy of the toner replenished from the toner replenishment device 42 to the first chamber 348 is basically equivalent to the above-described consumption amount Qx of the toner. However, the consumption amount Qx the toner cannot be directly measured. Thus, in the first example, the consumption amount Qx of the toner is estimated based on a printing rate Rx derived from the image data to be printed, that is, the required replenishment amount Qy of the toner is calculated.

FIG. 3 shows a relationship among the printing rate Rx, the required replenishment amount Qy of the toner, a required replenishment time Ty (=Qy/Vq) of the toner, and a time difference ΔTz, when the sheet size is A4 size and a replenishment speed Vq of the toner by the toner replenishment device 42 is 0.2 g/s. The time difference ΔTz is a value (=Ty−Tx) obtained by subtracting the printing time Tx per sheet from the required replenishment time Ty. A printing speed of the image forming device according to the first example is 90 sheets/min, and thus the printing time Tx per sheet is 0.667 s (=60 s/90). The replenishment speed Vq of the toner by the toner replenishment device 42 is constant. More specifically, the replenishment speed Vq is a constant value that can sufficiently ensure the agitation time required for charging the toner replenished to the development device 34 by the toner replenishment device 42 as intended. In this example, the replenishment speed Vq is the value 0.2 g/s, as described above. Thus, a maximum toner replenishment amount Qmax (=Vq·Tx) per sheet is 0.133 g (strictly speaking, 0.1333 . . . g).

As shown in FIG. 3, for example, the required replenishment amount Qy of the toner when the printing rate Rx is 5% is 0.019 g, the time Ty required to replenish the toner of the amount Qy of 0.019 g is 0.093 s, and the time difference ΔTz is −0.575 s. The fact that the time difference ΔTz is a negative value means that the toner consumed by the printing, that is, the toner corresponding to the required replenishment amount Qy can be replenished within the printing time Tx per sheet, in other words, while printing is performed on one sheet. For example, when the printing rate Rx is 36%, the required replenishment amount Qy of the toner is 0.133 g (strictly speaking, 0.1332 . . . g), the time Ty required to replenish the toner of the amount Qy of 0.133 g is 0.666 s, and the time difference ΔTz is −0.001 s. Thus, even when the printing rate Rx is 36%, the toner corresponding to the required replenishment amount Qy can be replenished within the printing time Tx per sheet.

For example, when the printing rate Rx is 40%, the required replenishment amount Qy of the toner is 0.148 g, the time Ty required to replenish the toner of the amount Qy of 0.148 g is 0.740 s, and the time difference ΔTz is 0.073 s. The fact that the time difference ΔTz is a positive value means that the toner corresponding to the required replenishment amount Qy cannot be replenished within the printing time Tx per sheet, that is, the toner is replenished by the toner replenishment device 42 late. For example, when the printing rate Rx is 100% (so-called solid image), the required replenishment amount Qy of the toner is 0.370 g, the time Ty required to replenish the toner of the amount Qy of 0.370 g is 1.850 s, and the time difference ΔTz is 1.183 s. That is, when the printing rate Rx is 100%, the toner is replenished by the toner replenishment device 42 late relative to the consumption of the toner at all.

Thus, when the printing rate Rx is higher than a predetermined value, in this case, when the printing rate Rx is higher than 36%, and particularly when printing at such a high printing rate Rx is continuously performed, the toner is replenished by the toner replenishment device 42 excessively late relative to the consumption of the toner. Then, the amount of the toner in the development device 34 becomes insufficient, in other words, the density of the toner in the developer becomes insufficient. As a result, an image defect such as a decrease in density occurs in an image formed on the sheet, that is, the output image.

To avoid this, when the toner is replenished by the toner replenishment device 42 excessively late relative to the consumption of the toner, the printing including the development is interrupted, and forcible replenishment is performed, that is, the shortage of the toner is replenished. However, if the forcible replenishment is frequently performed, the printing is accordingly also interrupted frequently. This reduces productivity. Further, after the forcible replenishment is performed and before the printing is resumed, the developer in the development device 34 is required to be sufficiently agitated. If this agitation is insufficient, the developer is not charged as intended, that is, the developer is insufficiently charged, and charging unevenness occurs. Additionally, another image quality defect called fogging occurs in which a toner image is formed at an unintended portion of the sheet.

Thus, in the first example, a determination is made as to whether the forcible replenishment of the toner is to be performed based on the printing rate Rx derived from the image data. In particular, an appropriate determination is made as to whether the forcible replenishment is to be performed so that the image quality defects such as a decrease in density of the output image and fogging can be prevented while suppressing the frequency of performing the forcible replenishment.

Specifically, each time the printing on one sheet is performed, the time difference ΔTz is accumulated, and an accumulated required replenishment time Tz, which is an accumulated value of the time differences ΔTz, is compared with an accumulated required replenishment time threshold value Ta as a predetermined reference value. Then, when the accumulated required replenishment time Tz becomes the accumulated required replenishment time threshold value Ta or more, it is determined that the toner is replenished by the toner replenishment device 42 excessively late relative to the consumption of the toner, and thus the printing including the development is interrupted and then the forcible replenishment of the toner is performed. An initial value of the accumulated required replenishment time Tz is 0 s, and this is reset every time the forcible replenishment is performed. The accumulated required replenishment time Tz is 0 s or more, and thus, for example, when a value obtained by adding the time difference ΔTz to the accumulated required replenishment time Tz before update is a negative value, the accumulated required replenishment time Tz after update is set to 0 s.

The accumulated required replenishment time threshold value Ta is set (changed) based on an average printing rate Ra, which is the average value of the printing rates Rx of the N most recent sheets. For this purpose, a time threshold value table 200 shown in FIG. 4 is provided.

According to the time threshold value table 200, for example, when the average printing rate Ra of the N most recent sheets is 40% or less, a time of 2.50 s is set as the accumulated required replenishment time threshold value Ta. When the average printing rate Ra is more than 40% and 60% or less, a time of 2.00 s is set as the accumulated required replenishment time threshold value Ta. Further, when the average printing rate Ra is more than 60% and 80% or less, a time of 1.75 s is set as the accumulated required replenishment time threshold value Ta. When the average printing rate Ra is more than 80%, a time of 1.50 s is set as the accumulated required replenishment time threshold value Ta.

That is, as the average printing rate Ra of the N most recent sheets increases, a shorter time is set as the accumulated required replenishment time threshold value Ta. In other words, an appropriate accumulated required replenishment time threshold value Ta is set in accordance with the average printing rate Ra of the N most recent sheets. As a result, the forcible replenishment is performed at an appropriate timing in accordance with the average printing rate Ra of the N most recent sheets.

The value of N is, for example, 5. When the value of N is excessively large, the timing at which the forcible replenishment is performed is delayed and the above-described image quality defect may occur. On the other hand, when the value of N is excessively small, the forcible replenishment is frequently performed and thus productivity may be reduced. The value of N being 5 was derived. However, the value of N is not limited to 5 and may be arbitrarily changeable.

The determination procedure as to whether the forcible replenishment is to be performed will be described with reference to FIG. 5. Here, FIG. 5 illustrates an example of a determination procedure when a job including content of an instruction for continuously printing an image having a relatively high printing rate Rx of 50% on at least eight sheets (eight times) is received. The average printing rate Ra of the N most recent sheets at the time of receiving the job is 5%.

In the example shown in FIG. 5, the accumulated required replenishment time Tz increases each time printing on each sheet is performed. In addition, the accumulated required replenishment time threshold value Ta according to the average printing rate Ra is set. Then, when printing on the eighth sheet is performed, the accumulated required replenishment time Tz becomes the accumulated required replenishment time threshold value Ta or more, and it is determined that the forcible replenishment of the toner is required (hatched pattern). In this case, for example, after printing on the eighth sheet is performed, printing according to the job is interrupted. Then, the forcible replenishment of the toner is performed, that is, the replenishment of the toner by the toner replenishment device 42 is performed for the accumulated required replenishment time Tz at that time. As a result, the shortage of the toner is compensated.

After the forcible replenishment of the toner is performed, the developer in the development device 34 is agitated for a predetermined agitation time Tb in a state where the development device 34 does not perform the development, that is, the development device 34 is idly rotated. Thereafter, the printing according to the job is resumed. The agitation time Tb is, for example, 15 s.

On the other hand, as shown in FIG. 6, in a case of a job in which printing of an image having a relatively high printing rate Rx of 50% and printing of an image having a relatively low printing rate Rx of 5% or 10% are mixed, the accumulated required replenishment time Tz is suppressed to less than the accumulated required replenishment time threshold value Ta. That is, although the accumulated required replenishment time Tz increases while printing of the image having the relatively high printing rate Rx of 50% continues, the printing of the image having the relatively low printing rate Rx of 5% or 10% increases the accumulated required replenishment time Tz. As a result, a situation in which the accumulated required replenishment time Tz becomes the accumulated required replenishment time threshold value Ta or more is avoided, that is, a situation in which the forcible replenishment of the toner is to be performed is avoided.

Figure 7:
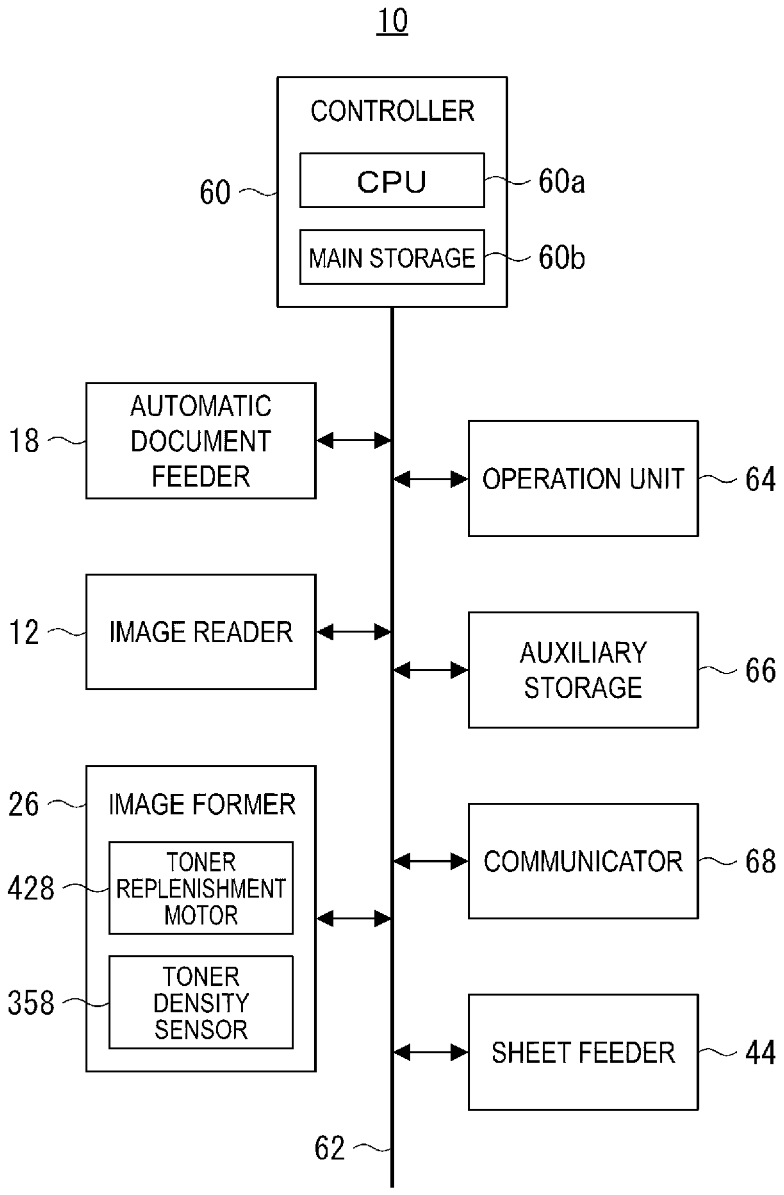
FIG. 7 is a block diagram illustrating an electrical configuration of the image forming device according to the first example.

FIG. 7 is a block diagram illustrating an electrical configuration of the image forming device 10. As illustrated in FIG. 7, the image forming device 10 includes a controller 60. The image scanner 12, the automatic document feeder 18, the image former 26, and the sheet feeder 44 are connected to the controller 60 via a bus 62. An operation unit 64, an auxiliary storage 66, a communicator 68, and the like are also connected to the controller 60 via the bus 62. The image forming device 10 includes various other elements, but illustration and description of elements that are not directly related to the gist of the present disclosure are omitted here. The image scanner 12, the automatic document feeder 18, the image former 26, and the sheet feeder 44 are as described above. In particular, the image former 26 includes the toner density sensor 358 and the toner replenishment motor 428.

The controller 60 is a control means that controls the entire image forming device 10. For this reason, the controller 60 includes a computer serving as a control execution means, for example a CPU 60*a*. In addition, the controller 60 includes a main storage 60*b* serving as a main storage that the CPU 60*a* can directly access. The main storage 60*b* includes, for example, a ROM and a RAM (not illustrated). The ROM stores a control program (firmware) for controlling the operation of the CPU 60*a*. The control program includes a toner replenishment control program and a toner replenishment program, which are to be described later. The time threshold value table 200 described above (FIG. 4) is incorporated in the toner replenishment control program. The RAM constitutes a work area and a buffer area when the CPU 60*a* executes processing according to the control program.

The operation unit 64 includes a display with a touch panel (not illustrated). The display with the touch panel is a component integrally combining a touch panel as an example of an operation reception means (not illustrated) configured to receive an operation by a user and a display as an example of a display means that displays various types of information. In addition to the display with the touch panel, the operation unit 64 includes an appropriate light emitting means such as an LED (not illustrated) and an appropriate hardware switch such as a push button (not illustrated).

The auxiliary storage 66 is an example of an auxiliary storage means. That is, various data such as the above-described scan image data and jobs are appropriately stored in the auxiliary storage 66. The auxiliary storage 66 includes, for example, a hard disk drive (not illustrated). In addition, the auxiliary storage 66 may include a rewritable nonvolatile memory such as a flash memory.

The communicator 68 is an example of a communication means. That is, the communicator 68 performs bidirectional communication processing via a LAN line (not illustrated). The communicator 68 may be connected to the LAN line in a wired manner or in a wireless manner. The communicator 68 also performs the bidirectional communication processing via a public switched telephone network (not illustrated).

As described above, according to the first example, the required replenishment amount Qy is calculated based on the printing rate Rx derived from the image data, and the toner is replenished to the development device 34 by the toner replenishment device 42 for the required replenishment time Ty in accordance with the required replenishment amount Q Then, the time difference ΔTz obtained by subtracting the printing time Tx per sheet from the required replenishment time Ty is accumulated, and when the accumulated required replenishment time Tz, which is the accumulated value of the time difference ΔTz, becomes the accumulated required replenishment time threshold value Ta or more, the printing according to the job is interrupted and the forcible replenishment of the toner is performed. Thereafter, the development device 34 is idly rotated for the predetermined agitation time Tb, and then the printing according to the job is resumed. To perform the toner replenishment according to such a procedure, the CPU 60*a* executes a toner replenishment control task in accordance with the above-described toner replenishment control program and executes a toner replenishment task in accordance with the toner replenishment program.

Figure 8:
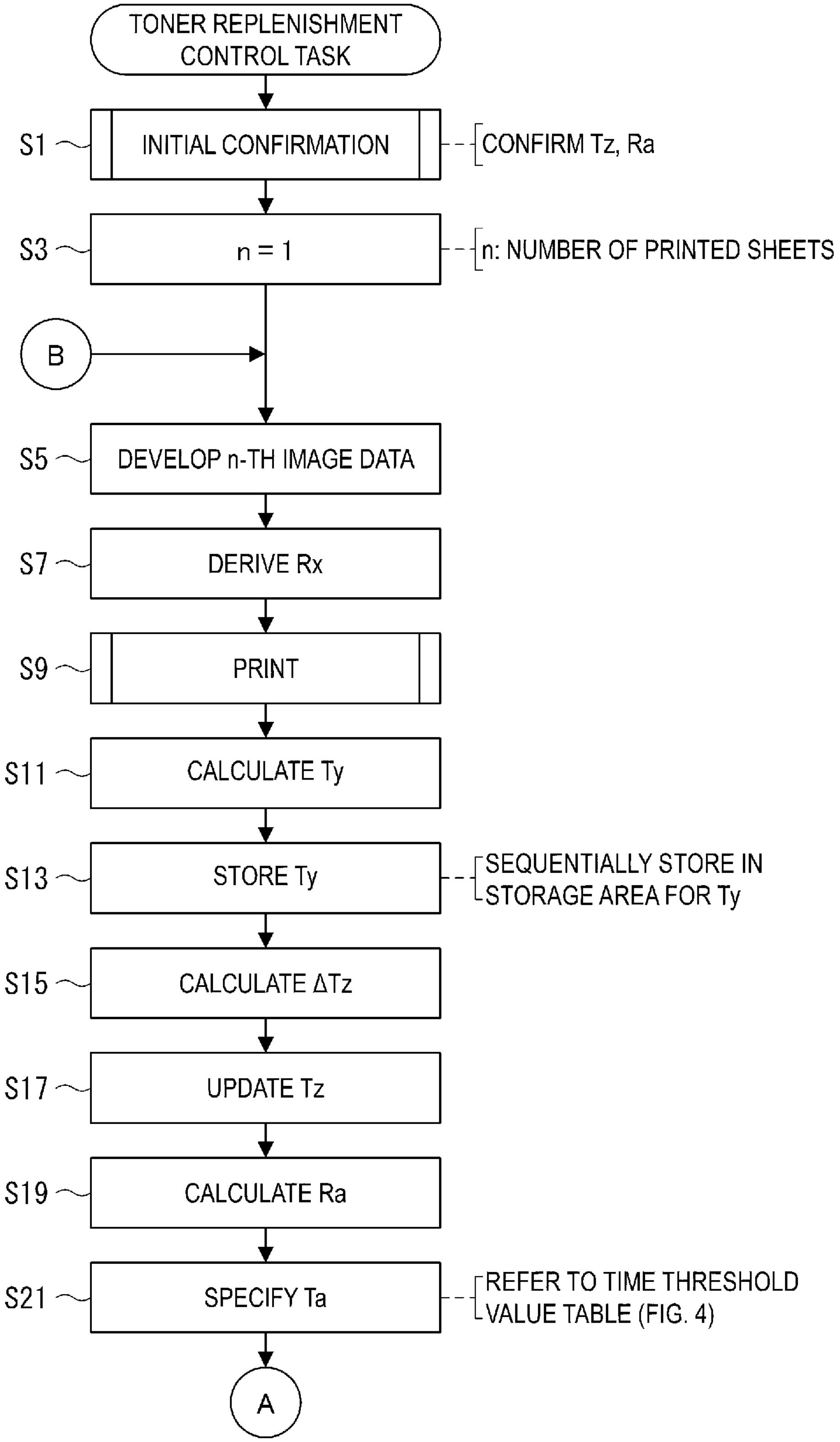
FIG. 8 is a flowchart showing a flow of a part of a toner replenishment control task in the first example.
Figure 9:
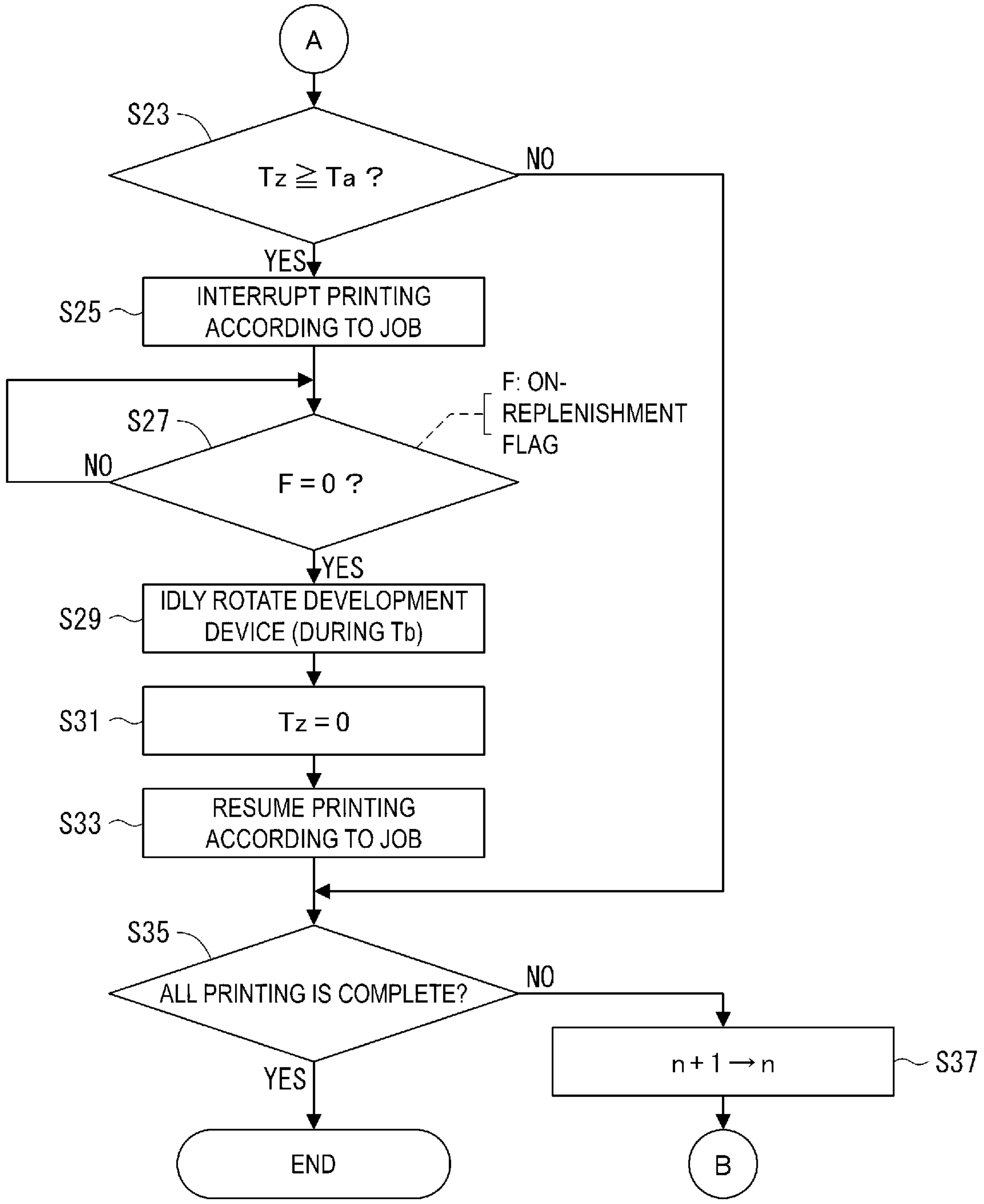
FIG. 9 is a flowchart showing a flow of a remaining part of the toner replenishment control task in the first example.

FIGS. 8 and 9 illustrate the flow of the toner replenishment control task. The toner replenishment control task is executed in response to reception of a job instructing printing. The "job" referred to here includes jobs for the printer function, the copy function, and the facsimile function (facsimile reception function).

According to the toner replenishment control task, in step S1, the CPU 60*a* first performs initial confirmation. In this initial confirmation, the CPU 60*a* refers to history information of a previous job to confirm the accumulated required replenishment time Tz and the average printing rate Ra of the N most recent sheets at this time (the toner replenishment control task start time). Then, the CPU 60*a* advances the processing to step S3.

In step S3, the CPU 60*a* sets a variable n representing the number of printed sheets to a value of 1, which is the initial value of the variable n. Then, in the subsequent step S5, the CPU 60*a* develops (analyzes) the image data to be printed on the n-th sheet. Further, in the subsequent step S7, the CPU 60*a* derives the printing rate Rx based on the image data developed in step S5. Then, in the subsequent step S9, the CPU 60*a* performs printing of the n-th sheet and then advances the processing to step S11.

In step S11, the CPU 60*a* calculates the required replenishment time Ty (=Qy/Vq). Then, in the subsequent step S13, the CPU 60*a* stores the required replenishment time Ty calculated in step S11 in a storage area (not illustrated) for the required replenishment time Ty provided in the auxiliary storage 66. The storage area for the required replenishment time Ty includes a plurality of small areas, and the required replenishment time Ty calculated in step S11 is stored in an appropriate empty area of the plurality of small areas. Then, the CPU 60*a* advances the processing to step S15.

In step S15, the CPU 60*a* calculates the time difference ΔTz (=Ty−Tx). Then, in the subsequent step S17, the CPU 60*a* adds the time difference ΔTz calculated in step S15 to the accumulated required replenishment time Tz, thus accumulating the time difference ΔTz, in other words, updating the accumulated required replenishment time Tz (Tz+ΔTz=Tz). As described above, since the accumulated required replenishment time Tz is 0 s or more, for example, when the value obtained by adding the time difference ΔTz to the accumulated required replenishment time Tz before update is a negative value, the accumulated required replenishment time Tz after update is set to 0 s. After updating the accumulated required replenishment time Tz, the CPU 60*a* advances the processing to step S19.

In step S19, the CPU 60*a* calculates the average printing rate Ra of the N most recent sheets. Then, in the subsequent step S21, the CPU 60*a* refers to the above-described time threshold value table 200 (FIG. 4) and specifies the accumulated required replenishment time threshold value Ta in accordance with the average printing rate Ra calculated in step S19. Then, the CPU 60*a* advances the processing to step S23.

In step S23, the CPU 60*a* compares the accumulated required replenishment time Tz with the accumulated required replenishment time threshold value Ta. In a case where the accumulated required replenishment time Tz is the accumulated required replenishment time threshold value Ta or more, the CPU 60*a* advances the processing to step S25. On the other hand, in a case where the accumulated required replenishment time Tz is less than the accumulated required replenishment time threshold value Ta, the CPU 60*a* advances the processing to step S35 to be described later.

In step S25, the CPU 60*a* interrupts the printing according to the job. At this time, a toner replenishment task to be described later has been executed, in particular, the toner has been replenished to the development device 34 by the toner replenishment device 42. Thus, when the printing according to the job is interrupted in step S25, the forcible replenishment of the toner is started at the same time. Subsequently, the CPU 60*a* advances the processing to step S27.

In step S27, the CPU 60*a* waits until an on-replenishment flag F is set to 0. The on-replenishment flag F is an index indicating whether the toner is being replenished by the toner replenishment device 42. For example, when the on-replenishment flag F is 0, the toner is not being replenished by the toner replenishment device 42. On the other hand, when the on-replenishment flag F is 1, the toner is being replenished by the toner replenishment device 42. Immediately after the printing according to the job is interrupted in the above-described step S25, since the toner is being forcibly replenished, that is, the toner is being replenished by the toner replenishment device 42, the on-replenishment flag F is 1. When the forcible replenishment of the toner is complete, the on-replenishment flag F changes to 0. In step S27, when the on-replenishment flag changes to 0, that is, when the forcible replenishment of the toner is complete, the CPU 60*a* advances the processing to step S29.

In step S29, the CPU 60*a* causes the development device 34 to be idly rotated for the above-described agitation time Tb. In the subsequent step S31, the CPU 60*a* returns the accumulated required replenishment time Tz to the initial value of 0 s. Further, in the subsequent step S33, the CPU 60*a* restarts the printing based on the job and then advances the processing to step S35.

In step S35, the CPU 60*a* determines whether all the printing according to the job is complete. In a case where all the printing according to the job is complete, the CPU 60*a* ends the toner replenishment control task. On the other hand, in a case where all the printing according to the job is not complete, the CPU 60*a* advances the processing to step S37. Then, in step S37, the CPU 60*a* increments the value of the variable n representing the number of printed sheets, and then returns the processing to step S5.

Figure 10:
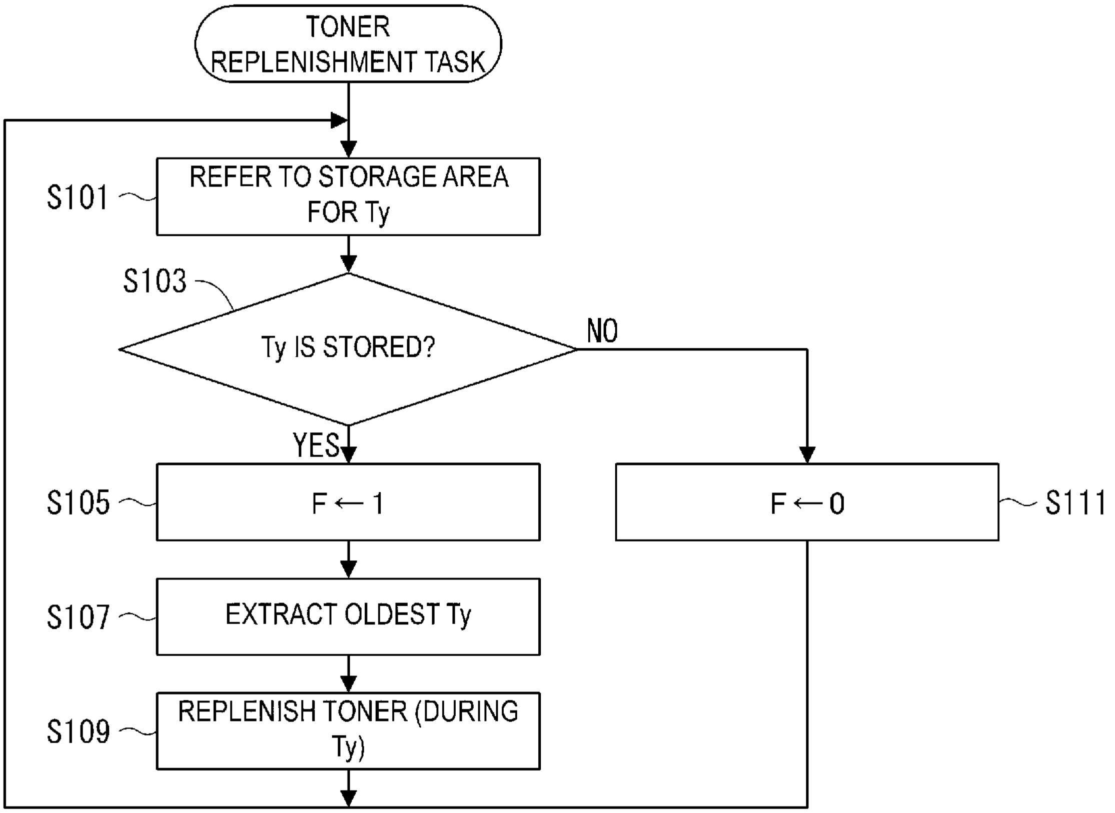
FIG. 10 is a flowchart showing a flow of a toner replenishment task in the first example.

Next, FIG. 10 illustrates the flow of the toner replenishment task. The toner replenishment task is repeatedly (continuously) executed.

According to the toner replenishment task, in step S101, the CPU 60*a* first refers to the storage area for the required replenishment time Ty. Then, the CPU 60*a* advances the processing to step S103.

In step S103, the CPU 60*a* determines whether the required replenishment time Ty is stored in the storage area for the required replenishment time Ty referenced in step S101. In a case where the required replenishment time Ty is stored in the storage area for the required replenishment time Ty, the CPU 60*a* advances the processing to step S105. On the other hand, in a case where the required replenishment time Ty is not stored in the storage area for the required replenishment time Ty, the CPU 60*a* advances the processing to step S111 to be described later.

In step S105, the CPU 60*a* sets the above-described on-replenishment flag F to 1. Subsequently, in the subsequent step S107, the CPU 60*a* extracts the required replenishment time Ty having the oldest storage order to the storage area for the required replenishment time Ty among the required replenishment times Ty stored in the storage area for the required replenishment time Ty. The extracted required replenishment time Ty is deleted from the storage area for the required replenishment time Ty. Subsequently, the CPU 60*a* advances the processing to step S109.

In step S109, the CPU 60*a* causes the toner replenishment device 42 to replenish the toner to the development device 34 for the required replenishment time Ty extracted in step S107 described above, that is, controls the toner replenishment device 42 (toner replenishment motor 428) to do so. Thereafter, the CPU 60*a* returns the processing to step S101.

On the other hand, in a case where the CPU 60*a* advances the processing from the above-described step S103 to step S111, in step S111, the CPU 60*a* sets the on-replenishment flag F to 0. Subsequently, the CPU 60*a* returns the processing to step S101.

As described above, according to the first example, the required replenishment amount Qy is calculated based on the printing rate Rx derived from the image data, and the toner is replenished to the development device 34 by the toner replenishment device 42 for the required replenishment time Ty in accordance with the required replenishment amount Qy. Then, the time difference ΔTz obtained by subtracting the printing time Tx per sheet from the required replenishment time Ty is accumulated, and a determination is made as to whether the forcible replenishment of the toner is to be performed based on a comparison between the accumulated required replenishment time Tz, which is the accumulated value of the time difference ΔTz, and the accumulated required replenishment time threshold value Ta. As a result, an appropriate determination is made as to whether the forcible replenishment of the toner is to be performed so that the image quality defects such as a decrease in density of the output image and fogging can be prevented while suppressing the frequency of performing the forcible replenishment.

Figure 11:
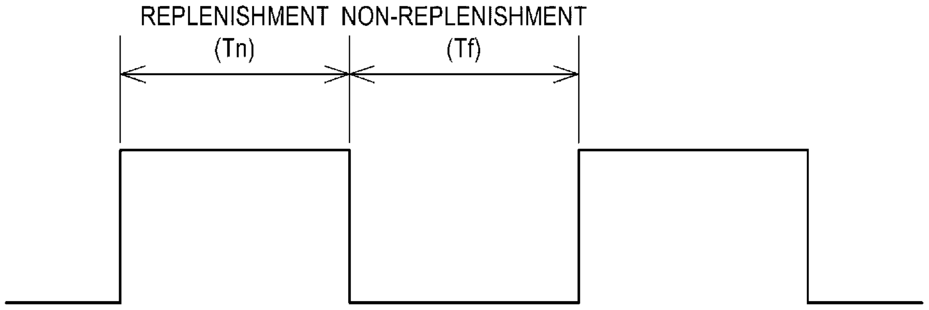
FIG. 11 is a diagram showing an example of a toner replenishment procedure at the time of the forcible replenishment in the first example.

In the forcible replenishment of the toner, the toner may be intermittently replenished from the toner replenishment device 42 to the development device 34. Specifically, as illustrated in FIG. 11, a replenishment state in which the toner is replenished from the toner replenishment device 42 to the development device 34 and a non-replenishment state in which the toner is not replenished from the toner replenishment device 42 to the development device 34 may be alternately formed. This so-called intermittent replenishment improves efficiency of agitating the developer containing the toner. On the other hand, the overall time required for the forcible replenishment is becomes longer. In view of this, a time Tn in the replenishment state and a time Tf in the non-replenishment state are appropriately set. For example, the time Tn in the replenishment state is set to 1 s and the time Tf in the non-replenishment state is set to 1 s, that is, a mutual ratio Tn:Tf of the times Tn and Tf is set to 1:1. Of course, other values may be used.

The CPU 60*a* in the first example, particularly the CPU 60*a* that calculates the required replenishment time Ty in accordance with the required replenishment amount Qy in step S11 of the toner replenishment control task, is an example of a calculation means according to the present disclosure. The time difference ΔTz in the first example, strictly speaking, the time difference ΔTz when the time difference ΔTz is a positive value corresponds to the replenishment shortage amount according to the present disclosure, and specifically corresponds to a time conversion value of the replenishment shortage amount. The accumulated required replenishment time Tz in the first example corresponds to the accumulated shortage amount according to the present disclosure, and specifically corresponds to a time conversion value of the accumulated shortage amount.

Further, in step S21 of the toner replenishment control task, the CPU 60*a* that specifies the accumulated required replenishment time threshold value Ta is an example of a first reference amount setting means according to the present disclosure. In step S109 of the toner replenishment task, the CPU 60*a* that causes the toner replenishment device 42 to replenish the toner to the development device 34 for the required replenishment time Ty is an example of a replenishment control means according to the present disclosure.

Second Example

Next, a second example of the present disclosure will be described.

In the second example, the agitation time Tb when the development device 34 is idly rotated is set (changed) in accordance with the average printing rate Ra of the N most recent sheets. For this purpose, an agitation time table 300 shown in FIG. 12 is provided.

According to the agitation time table 300, for example, when the average printing rate Ra of the N most recent sheets is 40% or less, a time of 10 s is set as the agitation time Tb. Even when the average printing rate Ra is more than 40% and 60% or less, a value of 10 s is set as the agitation time Tb. Further, when the average printing rate Ra is more than 60% and 80% or less, a time of 15 s is set as the agitation time Tb. Even when the average printing rate Ra is more than 80%, a time of 15 s is set as the agitation time Tb.

That is, as the average printing rate Ra of the N most recent sheets increases, a longer time is set as the agitation time Tb. In other words, an appropriate agitation time Tb is set in accordance with the average printing rate Ra of the N most recent sheets. Thus, particularly when the average printing rate Ra of the N most recent sheets is 60% or less, the development device 34 is prevented from being idly rotated for an unnecessarily long time (agitation time Tb). This greatly contributes to further improvement in productivity while realizing sufficient agitation of the developer by the idle rotation of the development device 34.

The agitation time table 300 is also incorporated in the toner replenishment control program. In step S29 of the toner replenishment control task, the CPU 60*a* refers to the agitation time table 300 and causes the development device 34 to be idly rotated for the agitation time Tb according to the average printing rate Ra of the N most recent sheets. The CPU 60*a* that sets the agitation time Tb according to the average printing rate Ra of the N most recent sheets is an example of an agitation time setting means according to the present disclosure.

As described above, according to the second example, an appropriate agitation time Tb is set in accordance with the average printing rate Ra of the N most recent sheets. As a result, productivity is further improved while realizing sufficient agitation of the developer by the idle rotation of the development device 34.

Third Example

Next, a third example of the present disclosure will be described.

In the third example, the accumulated required replenishment time threshold value Ta is multiplied by a threshold value coefficient β in accordance with a detected value of the toner density T/D detected by the toner density sensor 358, and a multiplied value β·Ta thereof is set as a target for comparison with the accumulated required replenishment time Tz. For this purpose, a threshold value coefficient table 400 shown in FIG. 13 is provided.

According to the threshold value coefficient table 400, for example, in a case where the toner density T/D is 5.0 wt % or less, the accumulated required replenishment time threshold value Ta is multiplied by a value of 0.75 as the threshold value coefficient β. In this case, the multiplied value β·Ta set to be the target of comparison with the accumulated required replenishment time Tz is smaller than the accumulated required replenishment time threshold value Ta, which facilitates the forcible replenishment of the toner. In a case where the toner density T/D is more than 5.0 wt % and 5.5 wt % or less, the accumulated required replenishment time threshold value Ta is multiplied by a value of 1.00 as the threshold value coefficient β. In this case, the multiplied value β·Ta set to be the target of comparison with the accumulated required replenishment time Tz is equivalent to the accumulated required replenishment time threshold value Ta. Further, when the toner density T/D is more than 5.5 wt % and 6.5 wt % or less, the accumulated required replenishment time threshold value Ta is multiplied by a value of 1.25 as the threshold value coefficient β. In this case, the multiplied value β·Ta set to be the target of comparison with the accumulated required replenishment time Tz is larger than the accumulated required replenishment time threshold value Ta, which makes the forcible replenishment of the toner difficult to perform. An appropriate value for the toner density T/D is, for example, 6.0 wt %.

In a case where the toner density T/D is more than 6.5 wt % and 7.0 wt % or less, the accumulated required replenishment time threshold value Ta is multiplied by a value of 1.00 as the threshold value coefficient β. In this case, the multiplied value β·Ta set to be the target of comparison with the accumulated required replenishment time Tz is equivalent to the accumulated required replenishment time threshold value Ta. In a case where the toner density T/D is more than 7.0 wt %, the accumulated required replenishment time threshold value Ta is multiplied by a value of 0.75 as the threshold value coefficient β. In this case, the multiplied value β·Ta set to be the target of comparison with the accumulated required replenishment time Tz is smaller than the accumulated required replenishment time threshold value Ta, which facilitates the forcible replenishment of the toner.

That is, in a case where the toner density T/D is 5.0 wt % or less, that is, in a case where the toner density T/D is excessively lower than the appropriate value of the toner density T/D, the accumulated required replenishment time threshold value Ta is corrected to facilitate the forcible replenishment of the toner. In a case where the toner density T/D is excessively low, a decrease in density of the output image or uneven agitation of the developer may occur. To avoid these issues, the accumulated required replenishment time threshold value Ta is corrected so that the forcible replenishment of the toner is facilitated.

Even in a case where the toner density T/D is more than 7.0 wt %, that is, even in a case where the toner density T/D is excessively higher than the appropriate value of the toner density T/D, the accumulated required replenishment time threshold value Ta is corrected to facilitate the forcible replenishment of the toner. In a case where the toner density T/D is excessively high, the toner in the development device 34 may splatter to the outside of the development device 34 (housing 352) or the above-described fogging phenomenon may occur. To avoid these issues, the accumulated required replenishment time threshold value Ta is corrected so that the forcible replenishment of the toner is facilitated.

In a case where the toner density T/D is more than 5.5 wt % and 6.5 wt % or less, that is, in a case where the toner density T/D is approximately the appropriate value, the accumulated required replenishment time threshold value Ta is corrected so as to make the forcible replenishment of the toner difficult to perform. In a case where the toner density T/D is approximately the appropriate value, there is almost no possibility of an inconvenience occurring as in the case where the toner density T/D is excessively high or excessively low. Thus, to further improve productivity, the accumulated required replenishment time threshold value Ta is corrected to make the forcible replenishment of the toner difficult to perform.

The threshold value coefficient table 400 is also incorporated in the toner replenishment control program. In step S21 of the toner replenishment control task, the CPU 60*a* refers to the threshold value coefficient table 400 and multiplies the specified accumulated required replenishment time threshold value Ta by the threshold value coefficient β in accordance with the detected value of the toner density T/D. Subsequently, in step S23 of the toner replenishment control task, the CPU 60*a* sets the multiplied value β·Ta obtained by multiplying the accumulated required replenishment time threshold value Ta by the threshold value coefficient β as the target of comparison with the accumulated required replenishment time Tz, and compares the multiplied value β·Ta with the accumulated required replenishment time Tz. The CPU 60*a* that sets the multiplied value β·Ta obtained by multiplying the accumulated required replenishment time threshold value Ta by the threshold value coefficient β as the target of comparison with the accumulated required replenishment time Tz is an example of a second reference value setting means according to the present disclosure.

As described above, according to the third example, the multiplied value β·Ta obtained by multiplying the accumulated required replenishment time threshold value Ta by the threshold value coefficient β in accordance with the toner density T/D is set to be the target of comparison with the accumulated required replenishment time Tz. As a result, productivity is further improved while the occurrence of an issue in the case where the toner density T/D is excessively high or excessively low is suppressed.

Other Application Examples

The above-described examples are specific examples of the present disclosure and do not limit the technical scope of the present disclosure. The present disclosure can be applied to aspects other than these examples.

For example, values such as the replenishment speed Vq of the toner replenishment device 42, the printing time Tx per sheet, a range of the average printing rate Ra and the accumulated required replenishment time threshold value Ta in the time threshold value table 200, a range of the average printing rate Ra and the agitation time Tb in the agitation time table 300, and a range of the toner density T/D and the threshold value coefficient β in the threshold value coefficient table 400 are merely examples and are not limited to these values.

The developer is not limited to a two-component developer and may be a one component developer that does not contain a carrier. However, the third example is based on a two-component developer.

Further, in each example, the monochrome image forming device 10 is referenced as an example, but the present disclosure can also be applied to a color image forming device.

In addition, although the image forming device 10 according to each example is a multifunction peripheral, the present disclosure can also be applied to an image forming device other than a multifunction peripheral, such as a print dedicated machine, a copy dedicated machine, and a fax dedicated machine.

The present disclosure can be provided not only in the form of a device called ab image forming device but also in the form of a method called a toner replenishment control method.

REFERENCE SIGNS LIST

10 Image forming device
26 Image former
28 Photoreceptor drum
34 Development device
42 Toner replenishment device
60 Controller
60*a* CPU
60*b* Main storage
342 First conveying screw
344 Second conveying screw
348 First chamber
350 Second chamber
358 Toner density sensor
424 Replenishment screw
428 Toner replenishment motor
Qy Required replenishment amount
Ra Average printing rate
Rx Printing rate
T/D Toner density
Ta Accumulated required replenishment time threshold value
Tb Agitation time
Ty Required replenishment time
Tz Accumulated required replenishment time
ΔTz Time difference
β Threshold value coefficient

The invention claimed is:

1. An image forming device comprising:

a developer including an accommodator containing a toner, the developer performing a development of visualizing a latent image, formed on an image carrier based on image data, into a toner image by causing the toner to adhere to the latent image;

a toner replenisher that replenishes the toner to the accommodator;

a calculator that calculates a required replenishment amount, which is a replenishment amount of the toner required to compensate for a consumption of the toner by the development, based on a printing rate derived from the image data;

a replenishment controller that controls the toner replenisher to replenish the toner corresponding to the required replenishment amount to the accommodator; and an accumulator that accumulates a replenishment shortage amount being a shortage of the replenishment amount of the toner to be replenished by the toner replenisher relative to the required replenishment amount, the shortage of the replenishment amount occurring when the printing rate is higher than a predetermined value, wherein when an accumulated shortage amount being an accumulated value of the replenishment shortage amount accumulated by the accumulator becomes a predetermined reference amount or more, the replenishment controller further interrupts the development by the developer and causes the toner replenisher to execute a forcible replenishment that includes replenishing the toner, corresponding to the accumulated shortage amount, to the accommodator, and when the accumulated shortage amount is not zero but less than the predetermined reference amount, and the printing rate is equal to or less than the predetermined value, the replenishment controller controls the toner replenisher such that the toner corresponding to at least a part of the accumulated shortage amount is replenishable to the accommodator in addition to the toner corresponding to the required replenishment amount based on the printing rate.

2. The image forming device according to claim 1, further comprising a first reference amount setter that sets the predetermined reference amount in accordance with an average printing rate being an average value of printing rates, including the printing rate, derived from the image data subjected to a most recent predetermined number of times of the development.

3. The image forming device according to claim 1, wherein the developer includes an agitator that agitates the developer accommodated in the accommodator, and the replenishment controller further causes the agitator to agitate the developer for a predetermined agitation time after executing the forcible replenishment by the toner replenisher and before resuming the development by the developer.

4. The image forming device according to claim 3, further comprising an agitation time setter that sets the predetermined agitation time in accordance with an average printing rate being an average value of printing rates, including the printing rate, derived from the image data subjected to a most recent predetermined number of times of the development.

5. The image forming device according to claim 1, wherein the replenishment controller causes the toner replenisher to intermittently replenish the toner to the accommodator in the forcible replenishment.

6. The image forming device according to claim 1, further comprising:

a toner density detector that detects a density of the toner contained in the developer accommodated in the accommodator; and a second reference amount setter that sets the predetermined reference amount in accordance with a toner density detected value detected by the toner density detector.

7. A toner replenishment control method performed by an image forming device, the image forming device comprising a developer including an accommodator containing a toner, the developer performing a development of visualizing a latent image, formed on an image carrier based on image data, into a toner image by causing the toner to adhere to the latent image, and a toner replenisher that replenishes the toner to the accommodator, the toner replenishment control method comprising:

calculating a required replenishment amount, which is a replenishment amount of the toner required to compensate for a consumption of the toner by the development, based on a printing rate derived from the image data;

controlling the toner replenisher to replenish the toner corresponding to the required replenishment amount to the accommodator;

accumulating a replenishment shortage amount being a shortage of the replenishment amount of the toner to be replenished by the toner replenisher relative to the required replenishment amount, the shortage of the replenishment amount occurring when the printing rate is higher than a predetermined value;

when an accumulated shortage amount being an accumulated value of the replenishment shortage amount accumulated by the accumulator becomes a predetermined reference amount or more, interrupting the development by the developer and causing the toner replenisher to execute a forcible replenishment that includes replenishing the toner, corresponding to the accumulated shortage amount, to the accommodator; and when the accumulated shortage amount is not zero but less than the predetermined reference amount, and the printing rate is equal to or less than the predetermined value, controlling the toner replenisher such that the toner corresponding to at least a part of the accumulated shortage amount is replenishable to the accommodator in addition to the toner corresponding to the required replenishment amount based on the printing rate.

* * * * *